(12) United States Patent
Yamamoto

(10) Patent No.: US 6,634,168 B1
(45) Date of Patent: Oct. 21, 2003

(54) EXHAUST GAS PURIFICATION SYSTEM

(75) Inventor: Shinji Yamamoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/420,552

(22) Filed: Oct. 19, 1999

(30) Foreign Application Priority Data

Oct. 19, 1998 (JP) .......................................... 10-296264
May 7, 1999 (JP) .......................................... 11-127456

(51) Int. Cl.$^7$ .............................................. F01N 3/00
(52) U.S. Cl. ............................ 60/285; 60/276; 60/299; 422/177
(58) Field of Search .................... 60/274, 276, 285, 60/286, 299, 300, 301; 422/177, 180; 423/213.5

(56) References Cited

U.S. PATENT DOCUMENTS

| | | | |
|---|---|---|---|
| 4,251,990 A | * 2/1981 | Norimatsu et al. | ............ 60/276 |
| 5,179,059 A | * 1/1993 | Domesle et al. | ......... 423/213.5 |
| 5,260,249 A | 11/1993 | Shiraishi et al. | |
| 5,399,324 A | * 3/1995 | Subramanian et al. | ... 423/213.5 |
| 5,538,698 A | * 7/1996 | Abe et al. | ...................... 60/300 |
| 5,743,087 A | * 4/1998 | Zahn et al. | .................... 60/301 |
| 5,746,052 A | * 5/1998 | Kinugasa et al. | ............. 60/274 |
| 5,855,854 A | * 1/1999 | Shinzawa et al. | ........... 422/177 |
| 5,946,905 A | * 9/1999 | Bouwman | ..................... 60/274 |
| 5,996,339 A | * 12/1999 | Gottberg et al. | .............. 60/301 |
| 5,997,830 A | * 12/1999 | Itoh et al. | ................. 423/213.5 |
| 6,047,544 A | * 4/2000 | Yamamoto et al. | ............ 60/285 |
| 6,052,989 A | * 4/2000 | McCabe et al. | ............... 60/285 |
| 6,076,348 A | * 6/2000 | Falandino et al. | ............ 60/276 |
| 6,112,520 A | * 9/2000 | Kaiho et al. | ................... 60/286 |
| 6,176,078 B1 | * 1/2001 | Balko et al. | ................... 60/274 |

FOREIGN PATENT DOCUMENTS

| | | |
|---|---|---|
| JP | 5-49929 | 3/1993 |
| JP | 5-200287 | 8/1993 |

\* cited by examiner

*Primary Examiner*—Thomas Denion
*Assistant Examiner*—Tu M. Nguyen
(74) *Attorney, Agent, or Firm*—Foley & Lardner

(57) ABSTRACT

The invention relates to an exhaust gas purification system for removing carbon monoxide, hydrocarbon and nitrogen oxide from an exhaust gas of an internal combustion engine. This system includes an upstream catalyst containing at least one selected from the group consisting of platinum, palladium and rhodium, and a downstream catalyst that is arranged downstream of the upstream catalyst. This downstream catalyst contains platinum in an amount greater than that of platinum of the upstream catalyst. In the system, a first oxygen excess ratio of an exhaust gas at an inlet of the upstream catalyst may be adjusted to at least 0.9, and a second oxygen excess ratio of an exhaust gas at an outlet of the upstream catalyst and at an inlet of the downstream catalyst may be adjusted to at least 0.1. Alternatively, a first air-fuel ratio of an exhaust gas at an inlet of the upstream catalyst may be adjusted to at least 14.5, and a second air-fuel ratio of an exhaust gas at an outlet of the upstream catalyst and at an inlet of the downstream catalyst may be adjusted to at least 13.3. The system is capable of removing even slightly oxidizable hydrocarbons.

24 Claims, 7 Drawing Sheets

EXHAUST GAS PURIFICATION SYSTEM

BACKGROUND OF THE INVENTION

The present invention relates to an exhaust gas purification system for purifying the exhaust gas emitted from the internal-combustion engine of automobiles and the like by removing hydrocarbons (HC), carbon monoxide (CO) and nitrogen oxides (NOx) of the exhaust gas.

Japanese Patent First Publication JP-A-5-200287 discloses a three-way catalyst. JP-A-5-49929 discloses a heat resistant three-way catalyst.

SUMMARY OF THE INVENTION

In case of an exhaust gas purification system having at least one upstream catalyst and at least one downstream catalyst, which are arranged in line in an exhaust gas passage of the system, hydrocarbons of the exhaust gas are allowed at first to flow through the upstream catalyst and then through the downstream catalyst. In view of this fact, the inventor unexpectedly found that most of easily oxidizable hydrocarbons are oxidized or removed by the upstream catalyst, and then an exhaust gas having a high content of slightly oxidizable hydrocarbons (e.g., saturated hydrocarbons) is allowed to flow through the downstream catalyst. Thus, he unexpectedly found that conversion of hydrocarbons by the downstream catalyst tends to be lower than that of hydrocarbons by the upstream catalyst. Then, he recognized a need for an exhaust gas purification that can sufficiently oxidize or remove even slightly oxidizable hydrocarbons.

It is therefore an object of the present invention to provide an exhaust gas purification system that is capable of removing hydrocarbons with high efficiency.

It is a more specific object of the present invention to provide an exhaust gas purification system that can sufficiently oxidize or remove even slightly oxidizable hydrocarbons.

According to the present invention, there is provided an exhaust gas purification system for removing carbon monoxide, hydrocarbon and nitrogen oxide from an exhaust gas of an internal combustion engine. This system comprises: an upstream catalyst comprising at least one selected from the group consisting of platinum, palladium and rhodium; and a downstream catalyst that is arranged downstream of the upstream catalyst. This downstream catalyst comprises platinum in an amount greater than that of the platinum of the upstream catalyst. In the system, a first oxygen excess ratio of an exhaust gas at an inlet of the upstream catalyst is adjusted to at least 0.9, and a second oxygen excess ratio of an exhaust gas at an outlet of the upstream catalyst and at an inlet of the downstream catalyst is adjusted to at least 0.1.

DESCRIPTION OF THE PREFERRED EMBODIMENTS

Figure 1:
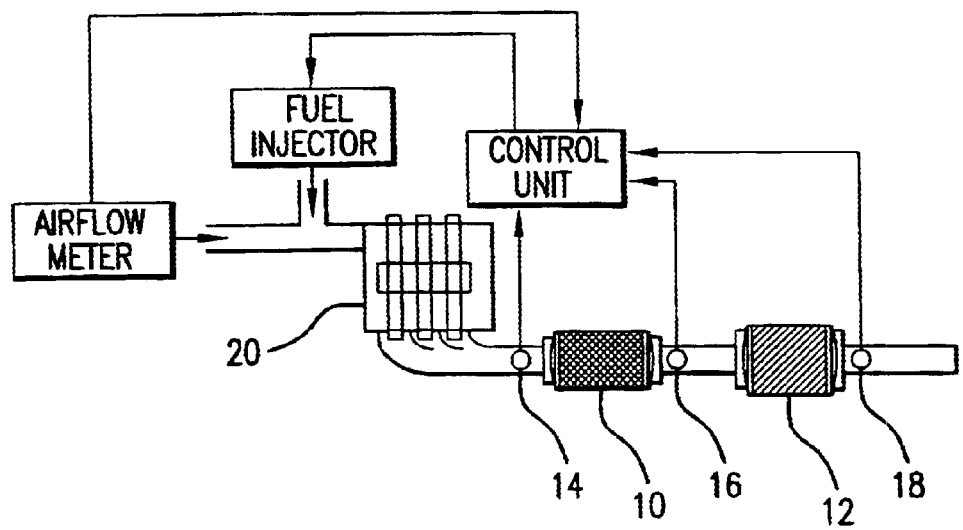
FIG. 1 is a schematic view showing a first exhaust gas purification system according to a first preferred embodiment of the present invention.
Figure 2:
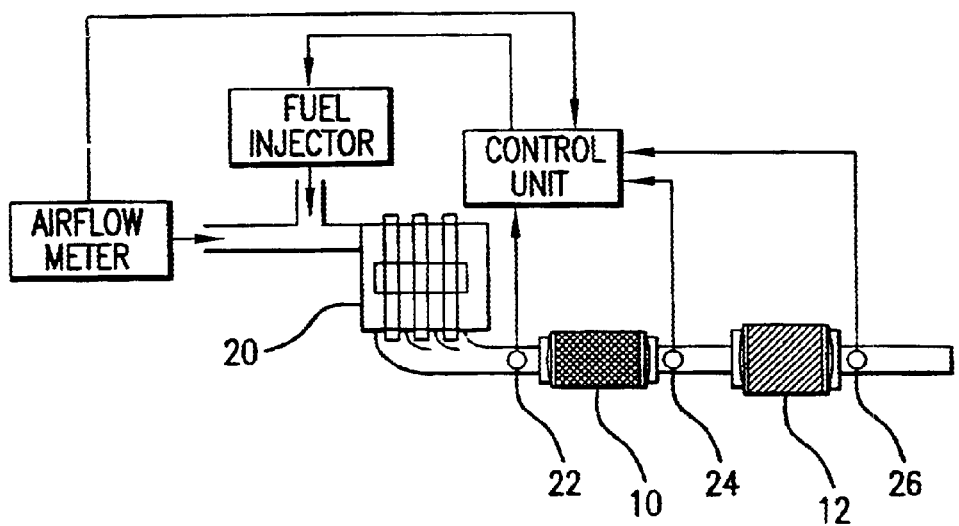
FIG. 2 is a schematic view showing a second exhaust gas purification system according to a second preferred embodiment of the present invention.

An exhaust gas purification system according to the invention comprises (1) at least one first catalyst (upstream catalyst) 10 comprising at least one selected from platinum, palladium and rhodium and (2) at least one second catalyst (downstream catalyst) 12 comprising platinum in an amount greater than that of the platinum of the upstream catalyst (see FIGS. 1–2). In other words, when the upstream catalyst contains no platinum, the downstream catalyst contains platinum in an amount greater than zero. Thus, the upstream and downstream catalysts are arranged in an exhaust gas passage of the system in an ascending order of platinum content toward a more downstream position of the passage. Furthermore, according to the system, a first oxygen excess ratio (Z1) of an exhaust gas at an inlet of the upstream catalyst is adjusted to at least 0.9, and a second oxygen excess ratio (Z2) of an exhaust gas at an outlet of the upstream catalyst and at an inlet of the downstream catalyst is adjusted to at least 0.1. Alternatively, according to the invention, a first air-fuel ratio of the exhaust gas at an inlet of the upstream catalyst is adjusted to at least 14.5, and a second air-fuel ratio of the exhaust gas at an outlet of the upstream catalyst and at an inlet of the downstream catalyst is adjusted to at least 13.3. It is needless to say that the composition of the exhaust gas at the outlet of the upstream catalyst is substantially the same as that of the exhaust gas at the inlet of the downstream catalyst, provided that there is no additional catalyst between these upstream and downstream catalysts. The inventor unexpectedly found that it becomes possible to have a sufficient catalytic activity of platinum by these adjustments of Z1 and Z2 or those of the first and second air-fuel ratios. Furthermore, the upstream and downstream catalysts are arranged in the above-mentioned ascending order of platinum content. Therefore, it becomes possible in the invention to selectively remove slightly oxidizable hydrocarbons, which are mainly composed of paraffinic hydrocarbons, by the downstream catalyst under the stoichiometric and lean conditions.

In the invention, the oxygen excess ratio (Z) of an exhaust gas may be defined by the following formula:

$$Z=(O_2+1.5*NO)/(0.5*CO+0.5*H_2+1.5*HC)$$

where $O_2$, NO, CO, $H_2$ and HC respectively represent their concentrations in the exhaust gas in the same system of units, and * represents multiplication. A higher value of the oxygen excess ratio is indicative of a leaner condition of the exhaust gas. In contrast, the air-fuel ratio (A/F) of the exhaust gas may be defined by the following experimental formula:

$$A/F=(28.98/6.171)*(16*CO+32*CO_2+32*O_2+16*1.7*1.9*CO*(CO_2+CO))/(3.4*CO_2+CO)*1/(13.91*(CO_2+CO+HC*0.0001))$$

where this formula is defined as above. A higher value of the air-fuel ratio of the exhaust gas is indicative of a leaner condition of the exhaust gas. An air-fuel ratio of the exhaust gas of 14.6 is indicative of a so-called stoichiometric exhaust gas obtained by combustion of a combination of air and fuel having a stoichiometric A/F ratio of 14.6. In other words, the above experimental formula is so made to have a solution of 14.6 when combustion of this combination of air and fuel (A/F=14.6) is conducted.

In the invention, as will be clarified hereinafter, it is possible to control the variation of the composition (i.e., Z or A/F) of the exhaust gas at the inlet of the downstream catalyst. With this control, it becomes possible to stably maintain the catalytic activity of the downstream catalyst and thereby substantially improve the purification capability thereof. In theory, the composition of the exhaust gas at the inlet of the downstream catalyst can be controlled by adjusting it to the stoichiometric composition in which A/F is 14.6 and the oxygen excess ratio is 1.0. As stated above, the inventor unexpectedly found that, in an exhaust gas purification system having at least one upstream catalyst and at least one downstream catalyst, the concentration of the total hydrocarbons in the exhaust gas at the inlet of the downstream catalyst decreases due to the exhaust gas purification by the upstream catalyst, but the content of slightly oxidizable hydrocarbons increases at the inlet of the downstream catalyst due to the removal of easily oxidizable hydrocarbons by the upstream catalyst. Thus, according to the invention, the amount by weight of platinum of the downstream catalyst is made to be greater than that of platinum of the upstream catalyst in order to sufficiently oxidize or decompose such slightly oxidizable hydrocarbons. Furthermore, the inventor unexpectedly found that, even if the composition of the exhaust gas at the inlet of the upstream catalyst is adjusted to the stoichiometric condition in which A/F is 14.6 or Z is 1.0, the median of A/F or Z at the inlet of the downstream catalyst deviates from 14.6 or 1.0. Furthermore, he found that the variation or amplitude of A/F or Z value at the inlet of the downstream catalyst is amplified as compared with that of A/F or Z value at the inlet of the upstream catalyst. In view of this, according to the invention, the composition of the exhaust gas at the inlet of the upstream catalyst is adjusted by the system to having an A/F value (preferably median) of at least 14.5 or a Z value (preferably median) of at least 0.9, and the composition of the exhaust gas at the inlet of the downstream catalyst is adjusted by the system to having an A/F value (preferably median) of at least 13.3 or a Z value (preferably median) of at least 0.1. With these adjustments, it becomes possible to efficiently remove hydrocarbons including slightly oxidizable hydrocarbons. If the composition of the exhaust gas at the inlet of the upstream catalyst has a first A/F value of less than 14.5 or a first Z value of less than 0.9, that at the inlet of the downstream catalyst will have a second A/F value of less than 13.3 or a second Z value of less than 0.1. With this, the efficiency to remove hydrocarbons by the system becomes substantially inferior. It is preferable that the first A/F value is in a range of 14.5–14.7, the first Z value (Z1) is of 0.9–1.2, the second A/F value is of 13.3–15.9 and that the second Z value (Z2) is of 0.1–10. Even if the first A/F value is adjusted to greater than 14.7 and/or the second A/F is adjusted to greater than 15.9, the purification efficiency to remove hydrocarbons may not improve further. By the same reason, the adjustment of Z1 to greater than 1.2 and/or that of Z2 to greater than 10 is not preferable. As mentioned above, according to the invention, the first and second A/F values are respectively adjusted to at least 14.5 and at least 13.3. In addition, it is preferable to adjust the variation (amplitude) of the first A/F value to falling within a range of ±0.3. With this, the inventor unexpectedly found that it becomes possible to make the variation of the second A/F value five or less times that of the first A/F value. With this, it becomes possible to stably obtain a sufficient purification capability of the downstream catalyst. Thus, it becomes possible to substantially improve the purification capability of the system as a whole. The maximum instantaneous variation of the second A/F value is preferably adjusted to falling in a range of 10.7∝16.8. This adjustment becomes possible by adjusting the variation of the first A/F value to falling within a range of ±0.3. Similar to the first and second A/F values, according to the invention, Z1 and Z2 values are respectively adjusted to at least 0.9 and at least 0.1. In addition, it is preferable to adjust the variation of Z1 to falling within a range of ±0.5. With this, the inventor unexpectedly found that it becomes possible to make the variation of Z2 fifty or less times that of Z1. With this, it becomes possible to obtain the same advantages as above. The maximum instantaneous variation of Z2 is preferably adjusted to falling in a range of 0.001–50. This adjustment becomes possible by adjusting the variation of Z1 to falling within a range of ±0.5.

It is preferable to start the above-mentioned adjustments of Z1 and Z2 values to at least 0.9 and at least 0.1 respectively or those of the first and second A/F values to at least 14.5 and at least 13.3 respectively, after the downstream catalyst reaches its activation in which, for example, conversion of hydrocarbons by the downstream catalyst reaches 50%. This activation can be obtained when the temperature of the downstream catalyst reaches 200° C. Thus, it becomes possible to improve the purification efficiency of the downstream catalyst. If the adjustments of Z1 and Z2 values or those of the first and second A/F values are started before the temperature of the downstream catalyst reaches its activation temperature, the efficiency of the removal of hydrocarbons by the downstream catalyst may become inferior.

In the invention, it is preferable to construct or design the upstream catalyst such that at least 90% of harmful substances of the exhaust gas, such as carbon monoxide, hydrocarbons and nitrogen oxides, is removed by the upstream catalyst and that these substances in an amount of greater than 0% and less than 10% are removed by the downstream catalyst. With this, it becomes possible to substantially improve the exhaust gas purification capability of the downstream catalyst and makes the same more stable. If these substances, which are to be removed by the upstream catalyst, are in an amount of less than 90%, the exhaust gas purification capability of the downstream catalyst may become inferior.

In the invention, the downstream catalyst optionally comprises palladium and/or rhodium besides platinum. With this, it becomes possible to improve conversion of hydrocarbons and NOx. It is preferable that platinum of the downstream catalyst is carried on a zirconium-containing oxide. It is more preferable that 20–80 wt % of the total weight of platinum of the is downstream catalyst is carried on the zirconium containing oxide. With this, it becomes possible to improve the purification capability of the downstream catalyst to remove hydrocarbons mainly comprised of paraffinic hydrocarbons, under the stoichiometric and lean condition. If it is less than 20 wt %, the purification capability of platinum may become inferior. If it is greater than 80 wt %, the purification capability of platinum may not improve further. The total amount of platinum carried on the downstream catalyst is preferably of 2–20 g per liter of the substrate. If it is less than 2 g per liter thereof, the purification capability of the downstream catalyst, which is attributed to platinum, may become inferior. If it is greater than 20 g per liter thereof, the purification capability of the downstream catalyst may not improve further. The concentration of platinum carried on the zirconium-containing oxide of the downstream catalyst is preferably of 1–10 wt %, based on the total weight of this platinum and the zirconium-containing oxide. If it is less than 1 wt %, the purification capability of platinum may become inferior. If it is greater than 10 wt %, the purification capability of platinum may not improve further.

In the invention, the zirconium-containing oxide, which carries thereon platinum, optionally includes at least one element selected from the group consisting of lanthanum, cerium, praseodymium, neodymium, silicon, titanium, aluminum and tungsten. With this, it becomes possible to substantially improve the purification capability of the downstream catalyst under the stoichiometric and lean conditions. The amount of the at least one element is preferably 1–40 mol %, based on the total moles of the at least one element and zirconium contained in the zirconium-containing oxide. If it is less than 1 mol %, the improvement of the purification capability by the addition of the at least one element may become insufficient. If it is greater than 40 mol %, the purification capability may not improve further.

Figure 7:
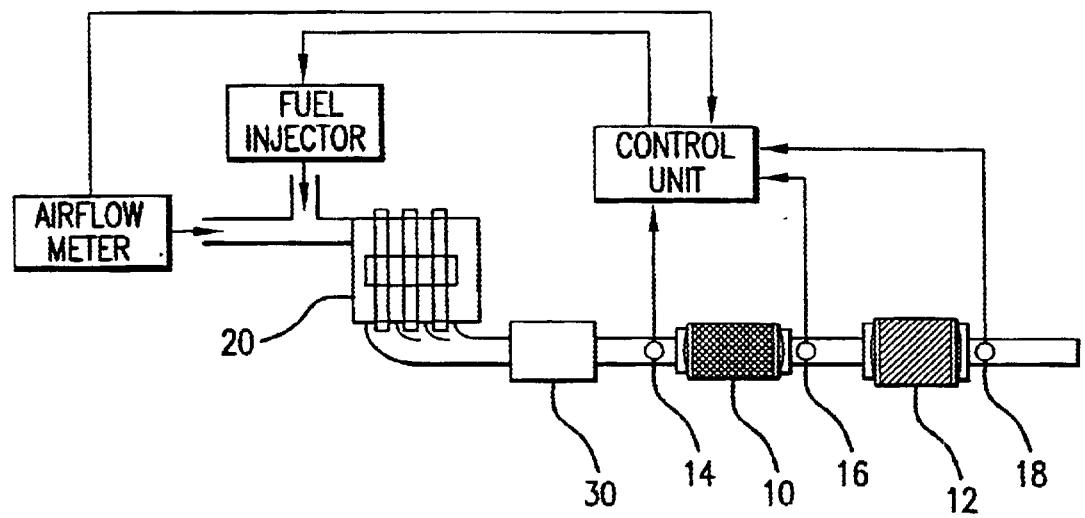
FIG. 7 is a schematic view showing an exhaust gas purification system with an upstream first catalyst according to an embodiment of the invention.
Figure 8:
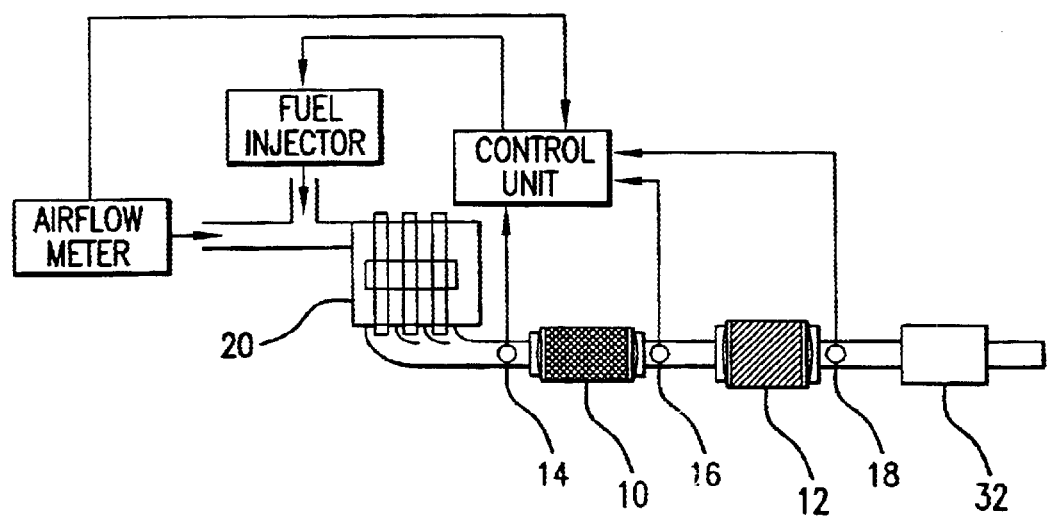
FIG. 8 is a schematic view showing an exhaust gas purification system with a downstream second catalyst according to an embodiment of the invention.
Figure 9:
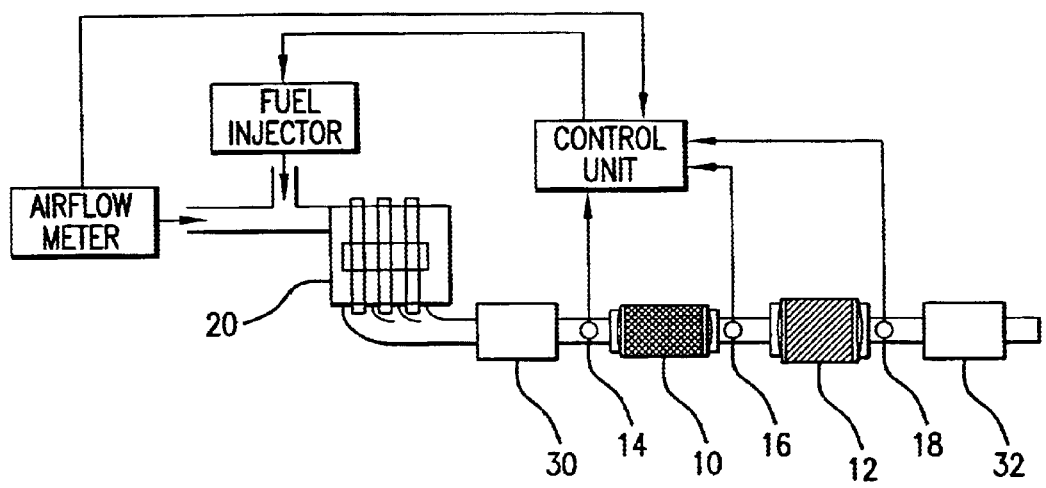
FIG. 9 is a schematic view showing an exhaust gas purification system with an upstream first catalyst and with a downstream second catalyst according to an embodiment of the invention.

Besides the upstream and downstream catalysts, the exhaust gas purification system of the invention optionally comprises at least one catalyst selected from the group consisting of (1) a first catalyst 30 comprising at least one selected from the group consisting of platinum, palladium and rhodium and (2) a second catalyst 32 comprising platinum. In this case, the upstream and downstream catalysts and the at least one catalyst are arranged in an exhaust gas passage of the system in an ascending order of platinum content toward a downstream position of the exhaust gas passage. With this, it becomes possible to substantially improve the purification capability of this system for removing hydrocarbons mainly comprised of paraffinic hydrocarbons, under the stoichiometric and lean conditions. If those catalysts are not arranged in the above ascending order of platinum content, it may become difficult to improve the purification capability of the catalysts(s) disposed on the downstream side of the exhaust gas passage. FIGS. 7 through 9 respectively illustrate embodiments of the invention additionally including the at least one catalyst comprising the first catalyst 30 and/or the second catalyst 32. Specifically, FIG. 7 illustrates an embodiment where the at least one catalyst comprises only the first catalyst 30; FIG. 8 illustrates an embodiment where the at least one catalyst comprises only the second catalyst 32; and FIG. 9 illustrates an embodiment where the at least one catalyst comprises both the first catalyst 30 and the second catalyst 32.

In the invention, the upstream and downstream catalysts are optionally united together to form a single combined catalyst. This single combined catalyst is also improved in the purification capability under the stoichiometric and lean conditions. Even this combined catalyst is preferably configured that these catalysts are arranged in the above ascending order of platinum content.

As will be clarified hereinafter, each of the upstream and downstream catalysts optionally comprises a substrate for supporting thereon a catalytic coating containing the above-mentioned catalytic component(s). It should be noted that the total apparent volume of the substrate is almost equal to that of the catalyst. Therefore, the substrate and the catalyst are interchangeable with each other in terms of apparent volume. The substrate of each catalyst is not particularly limited and may be selected from conventional ones. For example, it is optional to use a heat resistant monolithic (honeycomb) substrate made of a ceramic (e.g., cordierite) or metal material (e.g., ferrite-based stainless steel). Alternatively, it is optional to mold a catalytic component powder(s) into a honeycomb shape, without using a substrate. In other words, the resultant honeycomb made of the catalytic component powder(s) may be used as each catalyst.

In the invention, the catalytic coating carried on the substrate is preferably in an amount of from 50 to 400 g per liter of the substrate. If the amount of this catalytic coating is too much, the catalytic activity may not improve further. Furthermore, the resistance of the catalyst against the exhaust gas flow may become too high.

The following nonlimitative Examples 1–41 are illustrative of the present invention. In each of Examples 1–14, there was prepared a catalyst (catalytic converter) used in an exhaust gas purification system according to the present invention.

EXAMPLE 1

At first, a palladium nitrate aqueous solution was added to a γ-alumina powder Then, the obtained mixture was dried at 150° C. for 12 hr and then baked or calcined at 400° C. for 1 hr, thereby to prepare "powder A", that is, an alumina powder supporting thereon palladium. This powder A contained 10 wt % of palladium. Separately, a palladium nitrate aqueous solution was added to a cerium oxide powder containing 1 mol % of lanthanum and 32 mol % of zirconium. Then, the obtained mixture was dried at 150° C. for 12 hr and then baked at 400° C. for 1 hr, thereby to prepare "powder B", that is, a cerium oxide powder ($La_{0.01}Zr_{0.32}Ce_{0.67}O_x$) supporting thereon palladium. This powder B contained 2.85 wt % of palladium. Then, a magnetic ball mill was charged with 900 g of the powder A, 250 g of the powder B, 200 g of an alumina sol (containing 10% of $Al_2O_3$ in the form of solid) acidified with nitric acid, and 1,500 g of pure water. Then, this ball mill was driven to mix and grind these ingredients, thereby to obtain a slurry. Then, this slurry was applied to a cordierite monolithic (honeycomb) substrate having a volume of 1.7 liter and 400 cells per square inch. Then, an excessive amount of the slurry on the substrate was blown off by allowing air to flow through the cells. After that, the coated substrate was dried and then baked at 500° C. for 1 hr. This coating from the application of the slurry to the baking was repeated once again, thereby to obtain a coated substrate having 117 g of a first catalytic coating formed on the substrate per liter of the substrate. The amount of palladium of the coated substrate was 9.71 g per liter of the substrate (275 g/cubic feet (cf)).

Separately, a rhodium nitrate aqueous solution was added to a γ-alumina powder. Then, the obtained mixture was dried at 150° C. for 12 hr and then baked at 400° C. for 1 hr, thereby to prepare "powder C", that is, an alumina powder supporting thereon rhodium. This powder C contained 3 wt % of rhodium. Then, a magnetic ball mill was charged with 294.3 g of the powder C, 100 g of powder D, that is, a zirconium oxide powder containing 1 mol % of lanthanum and 20 mol % of cerium, 57 g of an alumina sol acidified with nitric acid, and 500 g of pure water. Then, this ball mill was driven to mix and grind these ingredients, thereby to obtain a slurry. Then, this slurry was applied to the above coated substrate. Then, an excessive amount of the slurry on the substrate was blown off by allowing air to flow through the cells. After that, the coated substrate was dried and then baked at 500° C. for 1 hr. This coating was repeated once again, thereby to form 40 g, per liter of the substrate, of a second catalytic coating on the first catalytic coating. Thus, there was obtained "catalyst A" (see Table 1) having 157 g of the total of the first and second catalytic coatings. As mentioned above, the amount of palladium of the catalyst A was 9.71 g per liter of the substrate. The amount of rhodium thereof was 0.88 g per liter of the substrate (25 g/cf). Table 1 further shows the total amount of these noble metals per liter of the substrate and the integral proportions of Pt, Pd and Rh (Pt:Pd:Rh).

EXAMPLE 2

At first, a palladium nitrate aqueous solution was added to a γ-alumina powder. Then, the obtained mixture was dried at 150° C. for 12 hr and then baked at 400° C. for 1 hr, thereby to prepare "powder E", that is, an alumina powder supporting thereon palladium. This powder E contained 15 wt % of palladium. Separately, a palladium nitrate aqueous solution was added to a cerium oxide powder containing 1 mol % of lanthanum and 32 mol % of zirconium. Then, the obtained mixture was dried at 150° C. for 12 hr and then baked at 400° C. for 1 hr, thereby to prepare "powder F", that is, a cerium oxide powder ($La_{0.01}Zr_{0.32}Ce_{0.67}O_x$) supporting thereon palladium. This powder F contained 6.0 wt % of palladium. Then, a magnetic ball mill was charged with 935.9 g of the powder E, 250 g of the powder F, 141 g of an alumina sol (containing 10% of $Al_2O_3$ in the form of solid) acidified with nitric acid, and 1,500 g of pure water. Then, this ball mill was driven to mix and grind these ingredients, thereby to obtain a slurry. Then, this slurry was applied to a cordierite monolithic (honeycomb) substrate having a volume of 1.7 liter and 400 cells per square inch. Then, an excessive amount of the slurry on the substrate was blown off by allowing air to flow through the cells. After that, the coated substrate was dried and then baked at 500° C. for 1 hr. This coating from the application of the slurry to the baking was repeated once again, thereby to obtain a coated substrate having 120 g of a first catalytic coating formed on the substrate per liter of the substrate. The amount of palladium of the coated substrate was 15.54 g per liter of the substrate (440 g/cf).

Separately, a rhodium nitrate aqueous solution was added to a γ-alumina powder. Then, the obtained mixture was dried at 150° C. for 12 hr and then baked at 400° C. for 1 hr, thereby to prepare "powder G", that is, an alumina powder supporting thereon rhodium. This powder G contained 6 wt % of rhodium. Separately, a dinitrodiammineplatinum aqueous solution was added to a γ-alumina powder (see Table 1). Then, the obtained mixture was dried at 150° C. for 12 hr and then baked at 400° C. for 1 hr, thereby to prepare "powder H", that is an alumina powder supporting thereon platinum (see Table 1). This powder H contained 3.0 wt % of platinum, based on the total weight of ther alumina powder and the platinum carried thereon (see Table 1). Then, a magnetic ball mill was charged with 294.3 g of the powder G, 117.7 g of the powder H, 100 g of the powder D, 180 g of an alumina sol acidified with nitric acid, and 500 g of pure water. Then, this ball mill was driven to mix and grind these ingredients, thereby to obtain a slurry. Then, this slurry was applied to the above coated substrate Then, an excessive amount of the slurry on the substrate was blown off by allowing air to flow through the cells. After that, the coated substrate was dried and then baked at 500° C. for 1 hr. This coating was repeated once again, thereby to form 53 g, per liter of the substrate, of a second catalytic coating on the first catalytic coating. Thus, there was obtained "catalyst B" having 173 g of the total of the first and second catalytic coatings. As mentioned above, the amount of palladium of the catalyst B was 15.54 g per liter of the substrate. The amount of rhodium of the catalyst B was 1.77 g per liter of the substrate (50 g/cf), and the amount of platinum thereof was 0.35 g per liter of the substrate (10 g/cf).

EXAMPLE 3

At first, a dinitrodiammineplatinum aqueous solution was added to a γ-alumina powder. Then, the obtained mixture was dried at 150° C. for 12 hr and then baked at 400° C. for 1 hr, thereby to prepare "powder I", that is, an alumina powder supporting thereon platinum. This powder I contained 8 wt % of platinum. Separately, a dinitrodiammineplatinum aqueous solution was added to a $ZrO_2$ powder. Then, the obtained mixture was dried at 150° C. for 12 hr and then baked at 400° C. for 1 hr, thereby to prepare "powder J", that is, a $ZrO_2$ powder supporting thereon platinum (see Table 1). This powder J contained 3 wt % of platinum (see Table 1). Then, a magnetic ball mill was charged with 883 g of the powder I, 883 g of the powder J. 200 g of a cerium oxide powder containing 1 mol % of lanthanum and 32 mol % of zirconium. 340 g of an alumina sol acidified with nitric acid, and 2,000 g of pure water. Then, this ball mill was driven to mix and grind these ingredients, thereby to obtain a slurry. Then, this slurry was applied to a cordierite monolithic (honeycomb) substrate having a volume of 1.7 liter and 400 cells per square inch. Then, an excessive amount of the slurry on the substrate was blown off by allowing air to flow through the cells. After that, the coated substrate was dried and then baked at 500° C. for 1 hr. This coating was repeated once again, thereby to obtain a coated substrate having 200 g of a first catalytic coating formed on the substrate per liter of the substrate. The amount of platinum of the coated substrate was 5.3 g per liter of the substrate (150 g/cf).

Then, a magnetic ball mill was charged with 294.3 g of the powder G, 100 g of the powder D, 57 g of an alumina sol acidified with nitric acid, and 500 g of pure water. Then, this ball mill was driven to mix and grind these ingredients, thereby to obtain a slurry Then, this slurry was applied to the above coated substrate. Then, an excessive amount of the slurry on the substrate was blown off by allowing air to flow through the cells. After that, the coated substrate was dried and then baked at 500° C. for 1 hr. This coating was repeated once again, thereby to form 40 g, per liter of the substrate, of a second catalytic coating on the first catalytic coating. Thus, there was obtained "catalyst C" having 240 g of the total of the first and second catalytic coatings. The amount of rhodium of the catalyst C was 1.77 g per liter of the substrate (50 g/cf).

EXAMPLE 4

In this example, Example 3 was repeated except in that the $ZrO_2$ powder used in the preparation of the powder J was replaced with a $ZrO_2$ powder containing 20 mol % of Ce, thereby to obtain "catalyst D".

EXAMPLE 5

In this example, Example 3 was repeated except in that the $ZrO_2$ powder used in the preparation of the powder J was replaced with a $ZrO_2$ powder containing 20 mol % of La, thereby to obtain "catalyst E".

EXAMPLE 6

In this example, Example 3 was repeated except in that the $ZrO_2$ powder used in the preparation of the powder J was replaced with a $ZrO_2$ powder containing 20 mol % of Nd, thereby to obtain "catalyst F".

EXAMPLE 7

In this example, Example 3 was repeated except in that the $ZrO_2$ powder used in the preparation of the powder J was replaced with a $ZrO_2$ powder containing 5 mol % of Pr, thereby to obtain "catalyst G".

EXAMPLE 8

In this example, Example 3 was repeated except in that the $ZrO_2$ powder used in the preparation of the powder J was replaced with a $ZrO_2$ powder containing 10 mol % of W, thereby to obtain "catalyst H".

EXAMPLE 9

In this example, Example 3 was repeated except in that the $ZrO_2$ powder used in the preparation of the powder J was replaced with a $ZrO_2$ powder containing 20 mol % of Si, thereby to obtain "catalyst I".

EXAMPLE 10

In this example, Example 3 was repeated except in that the $ZrO_2$ powder used in the preparation of the powder J was replaced with a $ZrO_2$ powder containing 20 mol % of Al, thereby to obtain "catalyst J".

EXAMPLE 11

In this example, Example 3 was repeated except in that the $ZrO_2$ powder used in the preparation of the powder J was replaced with a $ZrO_2$ powder containing 20 mol % of Ti, thereby to obtain "catalyst K".

EXAMPLE 12

In this example, Example 3 was repeated except in that the $ZrO_2$ powder used in the preparation of the powder J was replaced with a $ZrO_2$ powder containing 15 mol % of W and 5 mol % of Ti, thereby to obtain "catalyst L".

EXAMPLE 13

In this example, Example 3 was repeated except in that the $ZrO_2$ powder used in the preparation of the powder J was replaced with a $ZrO_2$ powder containing 15 mol % of W, 2 mol % of Si and 2 mol % of Al, thereby to obtain "catalyst M".

EXAMPLE 14

In this example, Example 3 was repeated except in that the $ZrO_2$ powder used in the preparation of the powder J was replaced with a $ZrO_2$ powder containing 15 mol % of W, 2 mol % of Ce and 2 mol % of La, thereby to obtain "catalyst N".

Comparative Example 1

In this example, Example 3 was repeated except in that the powder I was replaced with a $ZrO_2$ powder supporting thereon 3 wt % of platinum, thereby to obtain "catalyst O".

Comparative Example 2

In this example, Example 3 was repeated except in that the powder J was replaced with a $ZrO_2$ powder supporting thereon 0.5 wt % of platinum, thereby to obtain "catalyst P".

Comparative Example 3

In this example, Example 3 was repeated except in that the powder J was replaced with a $ZrO_2$ powder supporting thereon 15 wt % of platinum, thereby to obtain "catalyst Q".

Comparative Example 4

In this example, Example 3 was repeated except in that the powder J was replaced with a γ-alumina powder supporting thereon 3 wt % of platinum, thereby to obtain "catalyst R".

TABLE 1

| | Catalyst | Noble Metals (g/L) | Pt:Pd:Rh | Pt-carried Metal Oxide | Pt Percentage A* (wt %) | Pt Percentage B* (wt %) |
|---|---|---|---|---|---|---|
| Ex. 1 | A | 10.6 | 0:11:1 | — | — | — |
| Ex. 2 | B | 17.7 | 1:44:5 | Al2O3 | 3.0 | 100.0 |
| Ex. 3 | C | 7.1 | 3:0:1 | ZrO2 | 3.0 | 50.0 |
| Ex. 4 | D | 7.1 | 3:0:1 | ZrO2 (20 mol % Ce) | 3.0 | 50.0 |
| Ex. 5 | E | 7.1 | 3:0:1 | ZrO2 (20 mol % La) | 3.0 | 50.0 |
| Ex. 6 | F | 7.1 | 3:0:1 | ZrO2 (20 mol % Nd) | 3.0 | 30.0 |
| Ex. 7 | G | 7.1 | 3:0:1 | ZrO2 (5 mol % Pr) | 3.0 | 30.0 |
| Ex. 8 | H | 7.1 | 3:0:1 | ZrO2 (10 mol % W) | 3.0 | 60.0 |
| Ex. 9 | I | 7.1 | 3:0:1 | ZrO2 (20 mol % Si) | 3.0 | 60.0 |
| Ex. 10 | J | 7.1 | 3:0:1 | ZrO2 (20 mol % Al) | 3.0 | 60.0 |
| Ex. 11 | K | 7.1 | 3:0:1 | ZrO2 (20 mol % Ti) | 3.0 | 60.0 |
| Ex. 12 | L | 7.1 | 3:0:1 | ZrO2 (15 mol % W + 5 mol % Ti) | 3.0 | 60.0 |
| Ex. 13 | M | 7.1 | 3:0:1 | ZrO2 (15 mol % W + 2 mol % Si + 2 mol % Al) | 3.0 | 60.0 |
| Ex. 14 | N | 7.1 | 3:0:1 | ZrO2 (15 mol % W + 2 mol % Ce + 2 mol % La) | 3.0 | 60.0 |
| Com. Ex. 1 | O | 7.1 | 3:0:1 | ZrO2 | 3.0 | 100.0 |
| Com. Ex. 2 | P | 7.1 | 3:0:1 | ZrO2 | 0.5 | 100.0 |
| Com. Ex. 3 | Q | 7.1 | 3:0:1 | ZrO2 | 15.0 | 50.0 |
| Com. Ex. 4 | R | 7.1 | 3:0:1 | Al2O3 | 3.0 | 100.0 |

*Pt percentage A (wt %) is percent by weight of platinum carried on the metal oxide shown in Table 1, based on the total weight of this platinum and this metal oxide.
*Pt percentage B (wt %) is percent by weight of platinum carried on the metal oxide shown in Table 1, based on the total weight of platinum of the catalyst.

Examples 15–26 & Comparative Examples 5–12

"In each of Examples 15–26 and Comparative Examples 5–12, an exhaust gas purification system was prepared as shown in FIG. 1, using a combination of upstream and downstream catalysts 10 and 12 shown in Table 2, which are respectively adapted to be arranged downstream of the exhaust manifold and under the floor panel of an automobile. This system has first, second and third $O_2$ sensors 14, 16 and 18 for respectively sensing $O_2$ concentrations at an inlet of the upstream catalyst 10, an outlet of the upstream catalyst 10, and an outlet of the downstream catalyst 12. This system further has an engine 20 having in-line four cylinders of a displacement of 2,400 cubic centimeters and being connected to the upstream and downstream catalysts 10 and 12 through an exhaust gas passage. This system further has (1) a fuel injector for injecting fuel to the engine 20, (2) an airflow meter for measuring an airflow of an intake air to the engine 20, and (3) a control unit for adjusting the amount of fuel relative to the airflow. This system was subjected to a catalytic activity evaluation test under the following conditions:

Evaluation Method: North America LA 4 Modes, B, C Back;

IW: 3,250 (lbs); and

Fuel: Unleaded Gasoline

In fact, the catalytic activity evaluation test was conducted by executing one time the routine of a first flowchart shown in FIG. 3 by a control unit of FIG. 1 every time after the engine has been started, as follows."

Figure 3:
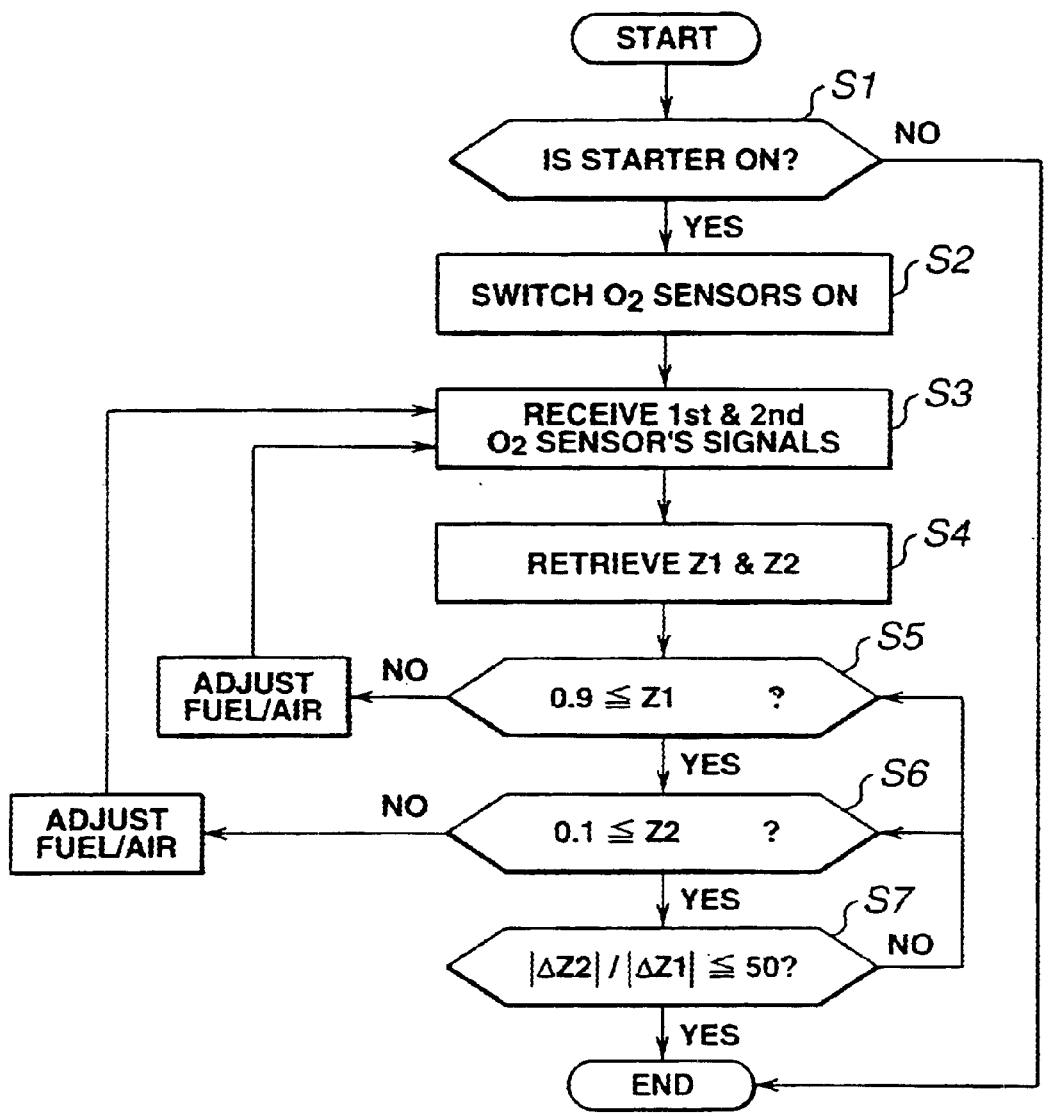
FIG. 3 is a flowchart for adjusting the first and second oxygen excess ratios (Z1 and Z2) of the exhaust gas, in accordance with the first preferred embodiment of the present invention.

At a step S1 of FIG. 3, the control unit checks whether the starter is on or off. When the decision at the step S1 is affirmative, that is, the starter key is on, the routine proceeds to a step S2. When the decision at the step S1 is negative, the routine jumps to the end.

At the step S2, the control unit switches the $O_2$ sensor on when the starter key is on.

At a step S3, the control unit receives first and second $O_2$ sensor's signals indicative of the $O_2$ concentrations at the inlet and outlet of the upstream catalyst.

At a step S4, the control unit retrieves first and second oxygen excess ratios (Z1 and Z2) respectively corresponding to the first and second $O_2$ sensor's signals, from a table or map.

At a step S5, the control unit checks whether the first oxygen excess ratio (Z1) is at least 0.9 or not. When the decision at the step S5 is affirmative, that is, Z1 is at least 0.9, the routine proceeds to a step S6. When the decision at the step S5 is negative, the control unit outputs an injection signal to the fuel injector for adjusting the amount of fuel relative to the amount of airflow measured by the airflow meter to an amount that corresponds to Z1 and was retrieved from a table. Then, the routine returns to the step S3.

At the step S6, the control unit checks whether the second oxygen excess ratio (Z2) is at least 0.1 or not. When the decision at the step S6 is affirmative, that is, Z2 is at least 0.1, the routine proceeds to a step S7. When the decision at the step S6 is negative, the control unit outputs an injection signal to the fuel injector for adjusting the amount of fuel relative to the amount of airflow measured by the airflow meter to an amount that corresponds to Z2 and was retrieved from a table. Then, the routine returns to the step S3.

At the step S7, the control unit checks whether or not the ratio of the absolute value of the variation of Z2 ($|\Delta Z2|$) to the absolute value of the variation of Z1 ($|\Delta Z1|$), which was retrieved from a table, is up to 50. When the decision at the step S7 is affirmative, that is, this ratio is up to 50, the routine proceeds to the end. When the decision at the step S7 is negative, that is, this ratio is greater than 50, the routine returns to the step S5.

The results of the evaluation test are shown in Table 2. The median Z1 and $\Delta$Z1 in the column of "Upstream Catalyst" in Table 2 refer to those of the exhaust gas at the inlet of the upstream catalyst. Similarly, the median Z2 and $\Delta$Z2 in the column of "Downstream Catalyst" in Table 2 refer to those of the exhaust gas at the inlet of the downstream catalyst "LA-4, B,C Back Conversion" shown in Table 2 refers to the total conversion of hydrocarbons by the upstream and downstream catalysts.

Figure 5:
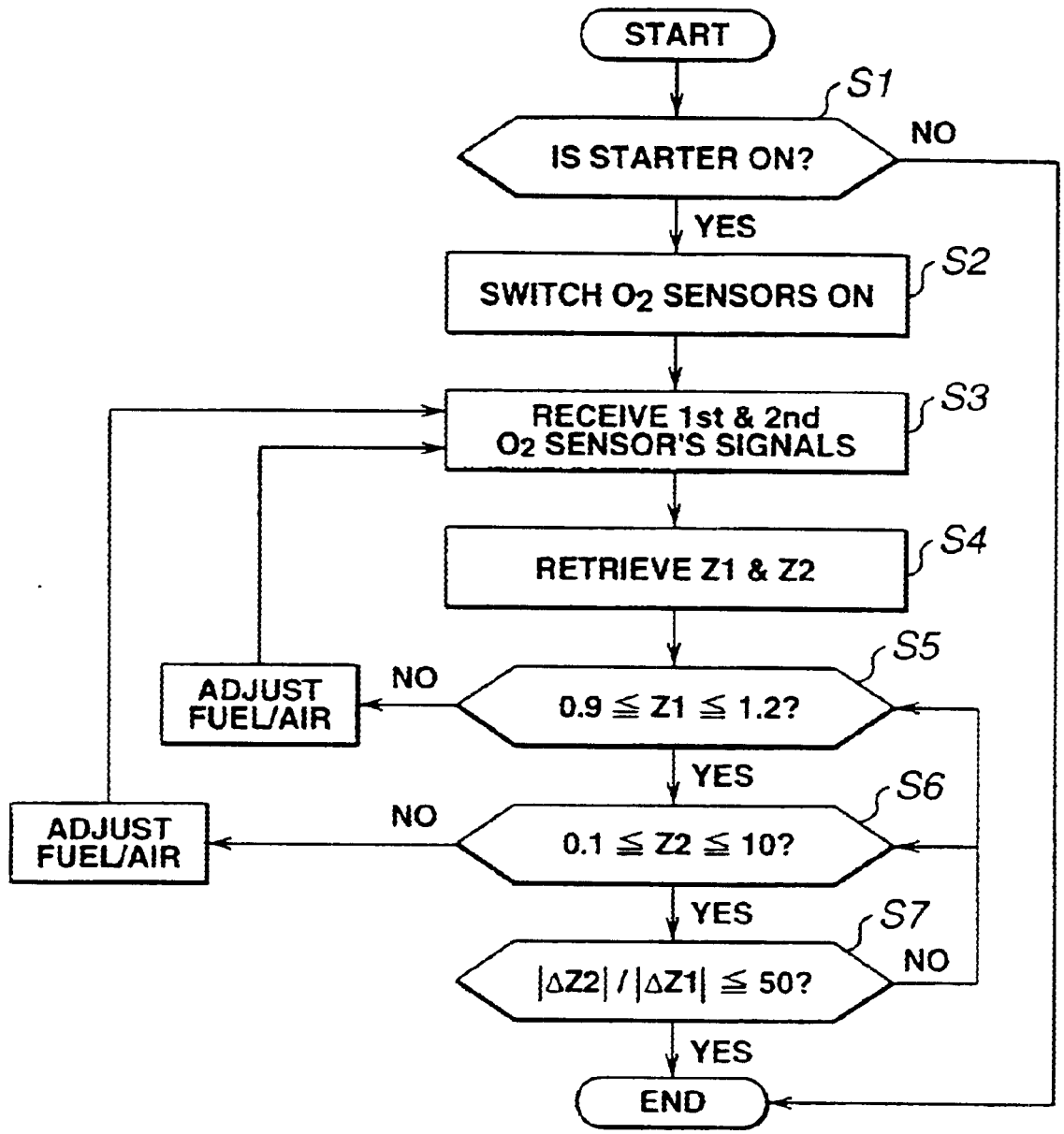
FIG. 5 is another flowchart similar to FIG. 3, in accordance with the first preferred embodiment of the present invention.

In the invention, the first flowchart of FIG. 3 can be replaced with another flowchart of FIG. 5. The latter flowchart is the same as the former flowchart, except in that the control unit checks whether Z1 is in a range of 0.9–1.2 or not at a step S5 and that the control unit checks whether Z2 is in a range of 0.1–10 or not at a step S6.

TABLE 2

| | Upstream Catalyst | | | | Downstream Catalyst | | | | LA-4 B, C |
| --- | --- | --- | --- | --- | --- | --- | --- | --- | --- |
| | Upstream Catalyst | Downstream Catalyst | Median of Z1 | $\Delta$ Z1 | HC Conversion (%) | Activation Temp. (° C.) | Median of Z2 | $\Delta$ Z2 | HC Conversion (%) | Back HC Conversion (%) |
| Ex. 15 | A | C | 0.98 | ±0.3 | 99.0 | 350 | 0.80 | $0.01 \leq Z2 \leq 20$ | $\geq$90 | $\geq$99.9 |
| Ex. 16 | A | D | 0.95 | ±0.25 | 98.9 | 350 | 0.50 | $0.01 \leq Z2 \leq 15$ | $\geq$90 | $\geq$99.9 |
| Ex. 17 | A | E | 0.90 | ±0.4 | 98.0 | 350 | 0.20 | $0.001 \leq Z2 \leq 25$ | $\geq$90 | $\geq$99.9 |
| Ex. 18 | B | C | 1.10 | ±0.4 | 99.0 | 350 | 5.00 | $0.01 \leq Z2 \leq 46$ | $\geq$90 | $\geq$99.9 |
| Ex. 19 | B | D | 0.98 | ±0.3 | 99.0 | 350 | 0.80 | $0.01 \leq Z2 \leq 20$ | $\geq$90 | $\geq$99.9 |
| Ex. 20 | B | E | 0.95 | ±0.25 | 98.9 | 300 | 0.50 | $0.01 \leq Z2 \leq 15$ | $\geq$90 | $\geq$99.9 |
| Ex. 21 | B | F | 0.95 | ±0.25 | 98.9 | 300 | 0.50 | $0.01 \leq Z2 \leq 15$ | $\geq$90 | $\geq$99.9 |
| Ex. 22 | B | G | 0.95 | ±0.25 | 98.9 | 300 | 0.50 | $0.01 \leq Z2 \leq 15$ | $\geq$90 | $\geq$99.9 |
| Ex. 23 | B | H | 0.95 | ±0.25 | 98.9 | 300 | 0.50 | $0.01 \leq Z2 \leq 15$ | $\geq$90 | $\geq$99.9 |
| Ex. 24 | B | I | 0.95 | ±0.25 | 98.9 | 300 | 0.50 | $0.01 \leq Z2 \leq 15$ | $\geq$90 | $\geq$99.9 |
| Ex. 25 | B | J | 2.00 | ±0.25 | 99.0 | 300 | 60.00 | $0.01 \leq Z2 \leq 15$ | $\geq$90 | $\geq$99.9 |
| Ex. 26 | B | K | 5.00 | ±0.25 | 99.0 | 300 | 70.00 | $0.01 \leq Z2 \leq 15$ | $\geq$90 | $\geq$99.9 |
| Com. Ex. 5 | A | C | 0.98 | ±0.3 | 89.0 | 350 | 0.80 | $0.01 \leq Z2 \leq 20$ | 60.0 | 95.6 |
| Com. Ex. 6 | A | C | 0.98 | ±0.3 | 92.0 | 350 | 0.80 | $0.01 \leq Z2 \leq 20$ | 55.0 | 96.4 |
| Com. Ex. 7 | A | C | 0.98 | ±0.3 | 92.0 | 350 | 0.80 | $0.01 \leq Z2 \leq 20$ | 55.0 | 96.4 |
| Com. Ex. 8 | A | C | 0.98 | ±0.3 | 85.0 | 350 | 0.80 | $0.01 \leq Z2 \leq 20$ | 50.0 | 92.5 |
| Com. Ex. 9 | A | C | 0.98 | ±0.3 | 99.0 | 150 | 0.80 | $0.01 \leq Z2 \leq 20$ | 60.0 | 99.6 |
| Com. Ex. 10 | A | C | 0.80 | ±0.3 | 90.0 | 350 | 0.04 | $0.01 \leq Z2 \leq 5$ | 75.0 | 97.5 |
| Com. Ex. 11 | A | C | 0.98 | ±0.6 | 90.0 | 350 | 0.80 | $0.00001 \leq Z2 \leq 45$ | 75.0 | 97.5 |
| Com. Ex. 12 | A | A | 0.98 | ±0.3 | 99.0 | 350 | 0.80 | $0.01 \leq Z2 \leq 20$ | 80.0 | 99.8 |

Examples 27–41 & Comparative Examples 13–24

In each of Examples 27–41 and Comparative Examples 13–24, an exhaust gas purification system was prepared as shown in FIG. 2, using a combination of upstream and downstream catalysts 10 and 12 shown in Table 3. This system is identical with that shown in FIG. 1, except in that each $O_2$ sensor was replaced with an A/F sensor 22, 24 or 26 for sensing A/F valuer. The system was subjected to a catalytic activity evaluation tent under the same conditions as above. In fact, the catalytic activity evaluation test was conducted by executing one time the routine of a second flowchart shown in FIG. 4, which is similar to the first flowchart shown in FIG. 3, by a control unit of FIG. 2 every time after the engine has been started, as follows.

Figure 4:
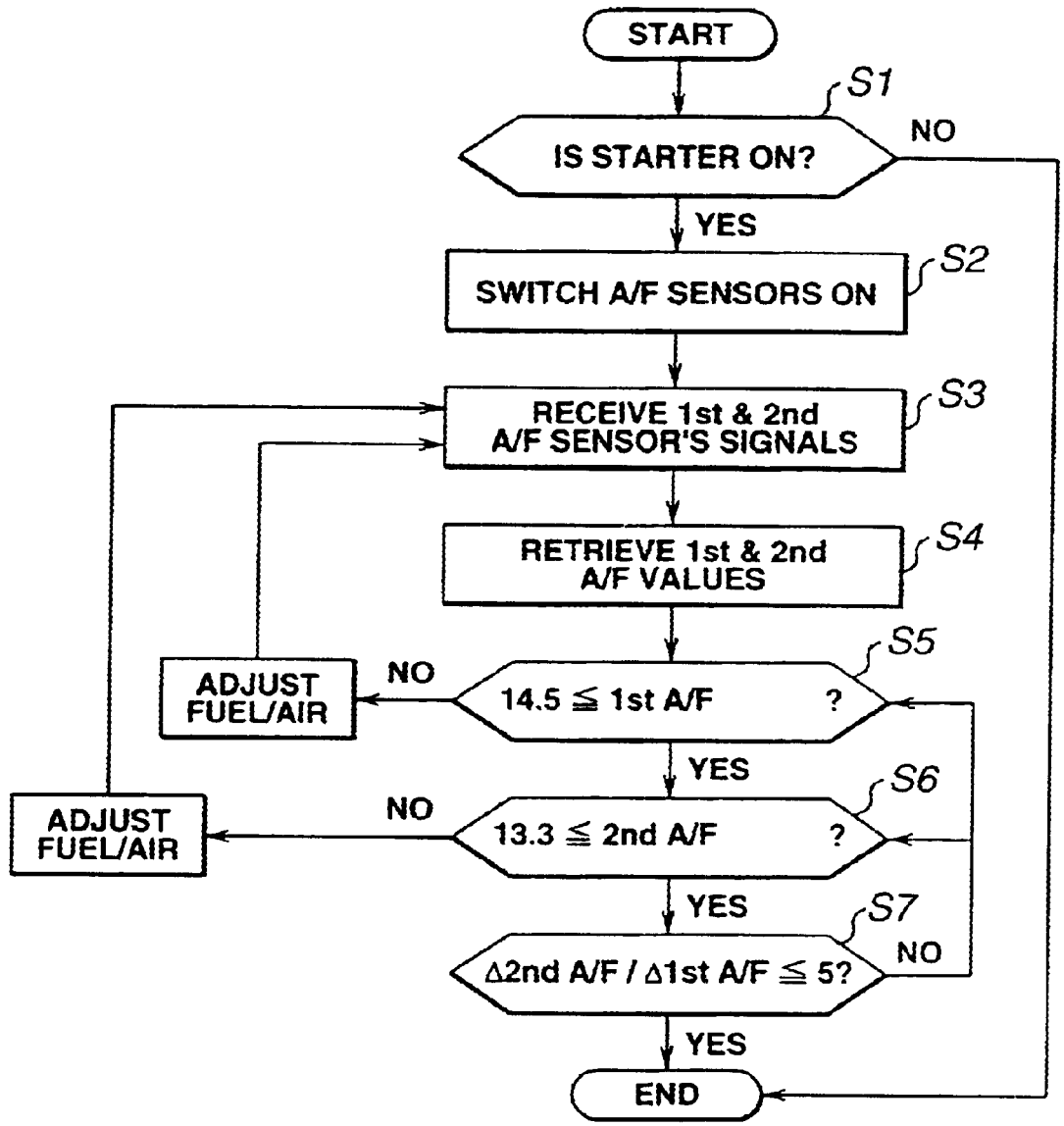
FIG. 4 is a flowchart for adjusting first and second air-fuel ratios (A/F) of the exhaust gas, in accordance with the second preferred embodiment of the present invention.

A step S1 of FIG. 4 is identical with the step S1 of FIG. 3.

At a step S2, the control unit switches the A/F sensors on when the starter key is on.

At a step S3, the control unit receives first and second A/F sensor's signals at the inlet and outlet of the upstream catalyst.

At a step S4, the control unit retrieves first and second A/F values (1st A/F and 2nd A/F) respectively corresponding to the first and second A/F sensor's signals, from a table or map.

At a step S5, the control unit checks whether the 1st A/F is at least 14.5 or not. When the decision at the step S5 is affirmative, that is, 1st A/F is at least 14.5, the routine proceeds to a step S6. When the decision at the step S5 is negative, the control unit outputs an injection signal to the fuel injector for adjusting the amount of fuel, relative to the amount of airflow measured by the airflow meter, to an amount that corresponds to the 1st A/F and was retrieved from a table. Then, the routine returns to the step S3.

At the step S6, the control unit checks whether the 2nd A/F is at least 13.3 or not. When the decision at the step S6 is affirmative, that is, the 2nd A/F is at least 13.3, the routine proceeds to a step S7. When the decision at the step S6 is negative, the control unit outputs an injection signal to the fuel injector for adjusting the amount of fuel, relative to the amount of airflow measured by the airflow meter, to an amount that corresponds to the 2nd A/F and was retrieved from a table. Then, the routine returns to the step S3.

At the step S7, the control unit checks whether or not the ratio of the variation of the 2nd A/F (Δ2nd A/F) to the variation of the 1st A/F (Δ1st A/F), which was retrieved from a table, is up to 5. When the decision at the step S7 is affirmative, that is, this ratio (Δ2nd A/F/Δ1st A/F) is up to 5, the routine proceeds to the end. When the decision at the step S7 is negative, that is, Δ2nd A/F/Δ1st A/F is greater than 5, the routine returns to the step S5.

The results of the evaluation test are shown in Table 3. The median of the 1st A/F and Δ1st A/F in the column of "Upstream Catalyst" in Table 3 refer to those of the exhaust gas at the inlet of the upstream catalyst. Similarly, the median of the 2nd A/F and Δ2nd A/F in the column of "Downstream Catalyst" in Table 3 refer to those of the exhaust gas at the inlet of the downstream catalyst.

Figure 6:
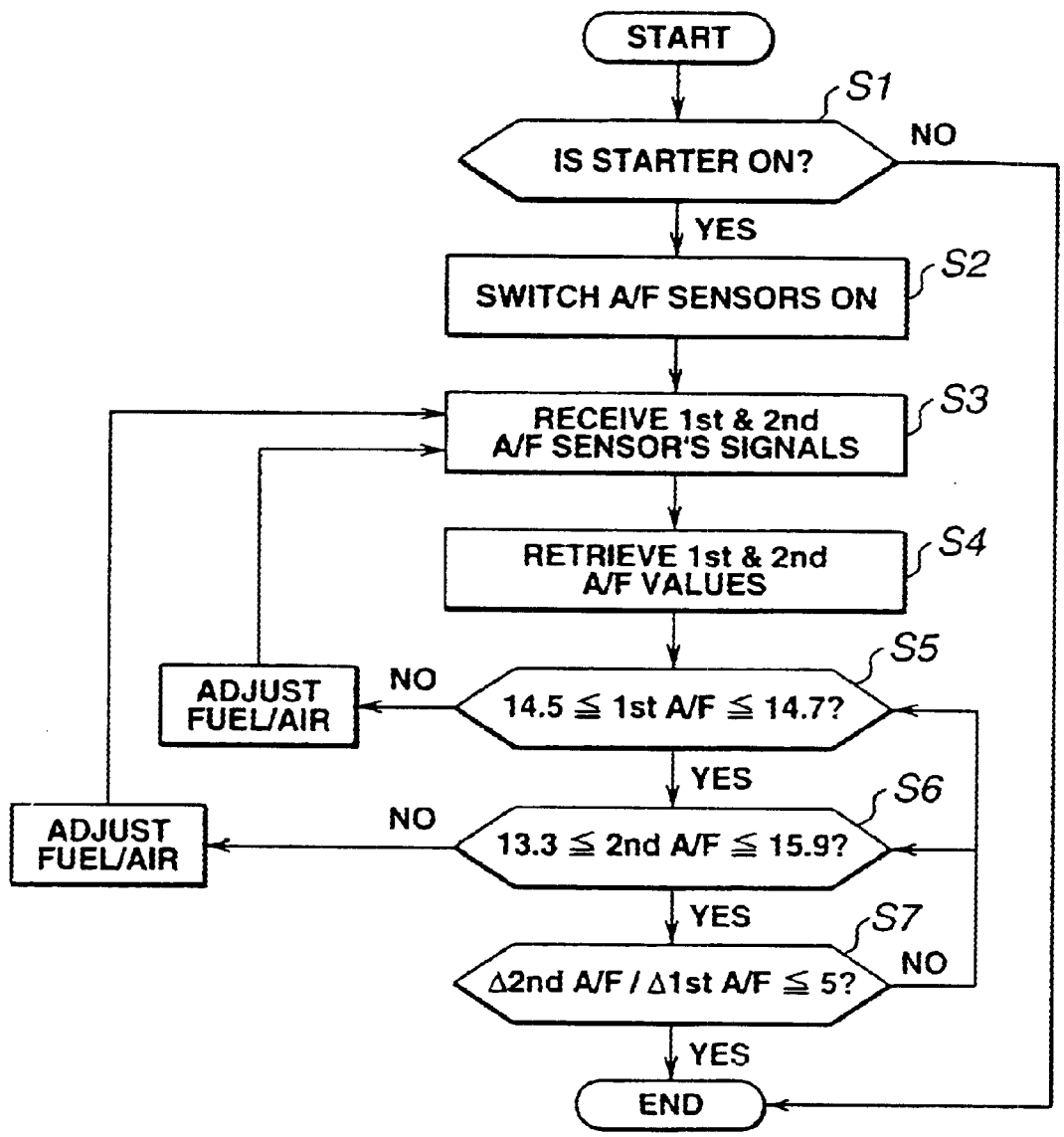
FIG. 6 is another flowchart similar to FIG. 4, in accordance with the second preferred embodiment of the present invention.

In the invention, the second flowchart of FIG. 4 can be replaced with another flowchart of FIG. 6. The latter flowchart is the same as the former flowchart, except in that the control unit checks whether the 1st A/F is in a range of 14.5–14.7 or not at a step S5 and that the control unit checks whether the 2nd A/F is in a range of 13.3–15.9 or not at a step S6.

TABLE 3

| | Upstream Catalyst | Downstream Catalyst | | | | | | LA-4 B, C | |
|---|---|---|---|---|---|---|---|---|---|
| | Upstream Catalyst | Downstream Catalyst | Median of 1st A/F | Δ 1st A/F | HC Conversion (%) | Activation Temp. (° C.) | Median of 2nd A/F | Δ 2nd A/F | HC Conversion (%) | Back HC Conversion (%) |
| Ex. 27 | A | C | 14.60 | ±0.2 | 99.1 | 350 | 14.60 | ±1.0 | ≧90 | ≧99.9 |
| Ex. 28 | A | D | 14.57 | ±0.2 | 99.0 | 350 | 14.57 | ±1.0 | ≧90 | ≧99.9 |
| Ex. 29 | A | E | 14.55 | ±0.2 | 98.9 | 350 | 14.55 | ±1.0 | ≧90 | ≧99.9 |
| Ex. 30 | B | C | 14.65 | ±0.2 | 99.1 | 350 | 14.65 | ±1.0 | ≧90 | ≧99.9 |
| Ex. 31 | B | D | 14.58 | ±0.2 | 99.0 | 350 | 14.58 | ±1.0 | ≧90 | ≧99.9 |
| Ex. 32 | B | E | 14.58 | ±0.2 | 99.0 | 300 | 14.58 | ±1.0 | ≧90 | ≧99.9 |
| Ex. 33 | B | F | 14.58 | ±0.2 | 99.0 | 300 | 14.58 | ±1.0 | ≧90 | ≧99.9 |
| Ex. 34 | B | G | 14.62 | ±0.2 | 99.1 | 300 | 14.62 | ±1.0 | ≧90 | ≧99.9 |
| Ex. 35 | B | H | 14.62 | ±0.2 | 99.1 | 300 | 14.62 | ±1.0 | ≧90 | ≧99.9 |
| Ex. 36 | B | I | 14.62 | ±0.2 | 99.1 | 300 | 14.62 | ±1.0 | ≧90 | ≧99.9 |
| Ex. 37 | B | J | 15.00 | ±0.2 | 99.2 | 300 | 15.00 | ±1.0 | ≧90 | ≧99.9 |
| Ex. 38 | B | K | 20.00 | ±0.2 | 99.3 | 300 | 20.00 | ±1.0 | ≧90 | ≧99.9 |
| Ex. 39 | B | L | 14.57 | ±0.2 | 99.0 | 350 | 14.57 | ±1.0 | ≧90 | ≧99.9 |
| Ex. 40 | B | M | 14.55 | ±0.2 | 98.9 | 350 | 14.55 | ±1.0 | ≧90 | ≧99.9 |
| Ex. 41 | B | N | 14.65 | ±0.2 | 99.1 | 350 | 14.65 | ±1.0 | ≧90 | ≧99.9 |
| Com. Ex. 13 | A | C | 14.40 | ±0.3 | 89.0 | 350 | 13.05 | ±1.0 | 60.0 | 95.6 |
| Com. Ex. 14 | A | C | 14.55 | ±0.5 | 92.0 | 350 | 13.05 | ±1.0 | 55.0 | 96.4 |
| Com. Ex. 15 | A | C | 14.55 | ±1.0 | 92.0 | 350 | 13.35 | ±1.0 | 55.0 | 96.4 |
| Com. Ex. 16 | A | C | 14.20 | ±0.5 | 85.0 | 350 | 13.40 | ±2.0 | 50.0 | 92.5 |
| Com. Ex. 17 | A | C | 14.60 | ±0.3 | 99.0 | 150 | 14.60 | ±1.0 | 60.0 | 99.6 |
| Com. Ex. 18 | A | C | 14.20 | ±0.3 | 90.0 | 350 | 14.20 | ±0.5 | 75.0 | 97.5 |
| Com. Ex. 19 | A | C | 14.60 | ±1.0 | 90.0 | 350 | 14.60 | ±2.0 | 75.0 | 97.5 |
| Com. Ex. 20 | A | A | 14.60 | ±0.3 | 99.0 | 350 | 14.60 | ±1.0 | 80.0 | 99.8 |
| Com. Ex. 21 | A | O | 14.60 | ±0.3 | 99.0 | 350 | 14.60 | ±1.0 | 75.0 | 99.8 |
| Com. Ex. 22 | A | P | 14.60 | ±0.3 | 99.0 | 350 | 14.60 | ±1.0 | 76.0 | 99.8 |
| Com. Ex. 23 | A | Q | 14.60 | ±0.3 | 99.0 | 350 | 14.60 | ±1.0 | 72.0 | 99.7 |
| Com. Ex. 24 | A | R | 14.60 | ±0.3 | 99.0 | 350 | 14.60 | ±1.0 | 70.0 | 99.7 |

The entire contents of Japanese Patent Applications P10-296264 (filed Oct. 19, 1998) and P11-127456 (filed May 7, 1999), of which priorities are claimed in the application, are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An exhaust gas purification system for removing carbon monoxide, hydrocarbon and nitrogen oxide from an exhaust gas of an internal combustion engine, said system comprising:

an upstream catalyst comprising at least one selected from the group consisting of platinum, palladium and rhodium; and a downstream catalyst that is arranged downstream of said upstream catalyst, said downstream catalyst comprising platinum in an amount greater than that of any platinum in said upstream catalyst, wherein a first oxygen excess ratio of an exhaust gas at an inlet of said upstream catalyst is adjusted to at least 0.9, and a second oxygen excess ratio of an exhaust gas at an outlet of said upstream catalyst and at an inlet of said downstream catalyst is adjusted to at least 0.1, wherein said second oxygen excess ratio has a variation that is greater than that of said first oxygen excess ratio.

2. A system according to claim 1, wherein said first and second oxygen excess ratios are respectively adjusted to at least 0.9 and at least 0.1 when said downstream catalyst has an activation temperature at which said downstream catalyst is activated.

3. A system according to claim 1, wherein said first and second oxygen excess ratios are respectively adjusted to at least 0.9 and at least 0.1 when said downstream catalyst has a temperature at which conversion of hydrocarbons of said exhaust gas is at least 50%.

4. A system according to claim 1, wherein said variation of said second oxygen excess ratio is adjusted to fifty or less times that of said first oxygen excess ratio.

5. A system according to claim 1, wherein said upstream catalyst removes at least 90% of said carbon monoxide, said hydrocarbon and said nitrogen oxide of said exhaust gas, and said downstream catalyst removes a rest of said carbon monoxide, said hydrocarbon and said nitrogen oxide of said exhaust gas, said rest being in an amount that is greater than 0% and not greater than 10%.

6. A system according to claim 1, wherein said downstream catalyst further comprises at least one of palladium and rhodium.

7. A system according to claim 1, wherein said system further comprises at least one catalyst selected from the group consisting of (1) a first catalyst comprising at least one selected from the group consisting of platinum, palladium and rhodium and (2) a second catalyst comprising platinum, and wherein said upstream and downstream catalysts and said at least one catalyst are arranged in an exhaust gas passage of said system in an ascending order of platinum content toward a downstream position of said exhaust gas passage.

8. A system according to claim 1, wherein said internal combustion engine is a gasoline engine.

9. A system according to claim 1, wherein said first oxygen excess ratio is changed to have a variation about a median value.

10. A system according to claim 1, wherein said first and second oxygen excess ratios are respectively adjusted to not greater than 1.2 and not greater than 10.

11. A system according to claim 10, wherein said first and second oxygen excess ratios are respectively adjusted to not greater than 1.2 and not greater than 10 when said downstream catalyst has an activation temperature at which said downstream catalyst is activated.

12. A system according to claim 10, wherein said first and second oxygen excess ratios are respectively adjusted to not greater than 1.2 and not greater than 10 when said downstream catalyst has a temperature at which conversion of hydrocarbons of said exhaust gas is at least 50%.

13. A system according to claim 10, wherein a maximum instantaneous variation of said second oxygen excess ratio is adjusted to falling within a range of from 0.001 to 50.

14. A system according to claim 1, wherein said upstream and downstream catalysts are united to form a single catalyst, wherein said downstream catalyst of said single catalyst further comprises a zirconium-containing oxide, and wherein 20–80 wt % of said platinum of said downstream catalyst is carried on said zirconium-containing oxide of said downstream catalyst.

15. A system according to claim 14, wherein a total of said platinum of said downstream catalyst is in an amount of 2–20 g per liter of said downstream catalyst, and wherein said platinum carried on said zirconium-containing oxide is in an amount of 1–10 wt %, based on a total weight of said zirconium-containing oxide and said platinum carried thereon.

16. A system according to claim 14, wherein said zirconium-containing oxide comprises 1–40 mol % of at least one element selected from the group consisting of lanthanum, cerium, praseodymium, neodymium, silicon, titanium, aluminum and tungsten, based on a total moles of said at least one element and zirconium contained in said zirconium-containing oxide.

17. A system according to claim 1, wherein a first air-fuel ratio of an exhaust gas at an inlet of said upstream catalyst is adjusted to at least 14.5, and a second air-fuel ratio of an exhaust gas at an outlet of said upstream catalyst and at an inlet of said downstream catalyst is adjusted to at least 13.3, wherein said second air-fuel ratio has a variation that is greater than that of said first air-fuel ratio.

18. A system according to claim 17, wherein said first and second air-fuel ratios are respectively adjusted to at least 14.5 and at least 13.3 when said downstream catalyst has an activation temperature at which said downstream catalyst has an activation temperature at which said downstream catalyst is activated.

19. A system according to claim 17, wherein said first and second air-fuel ratios are respectively adjusted to at least 14.5 and at least 13.3 when said downstream catalyst has a temperature at which conversion of hydrocarbons of said exhaust gas is at least 50%.

20. A system according to claim 17, wherein said variation of said second air-fuel ratio is adjusted to five or less times that of said first air-fuel ratio.

21. A system according to claim 17, wherein said first and second air-fuel ratios are respectively adjusted to not greater than 14.7 and not greater than 15.9.

22. A system according to claim 21, wherein said first and second air-fuel ratios are respectively adjusted to not greater than 14.7 and not greater than 15.9 when said downstream catalyst has an activation temperature at which said downstream catalyst is activated.

23. A system according to claim 21, wherein said first and second air-fuel ratios are respectively adjusted to not greater than 14.7 and not greater than 15.9 when said downstream catalyst has a temperature at which conversion of hydrocarbons of said exhaust gas is at least 50%.

24. A system according to claim 21, wherein a maximum instantaneous variation of said second air-fuel ratio is adjusted to falling within a range of from 10.7 to 16.8.

* * * * *